United States Patent [19]
Miller et al.

[11] Patent Number: 5,996,530
[45] Date of Patent: Dec. 7, 1999

[54] ATTACHMENT MEMBER FOR A POULTRY DRINKER AND POULTRY FEEDER FOR USE WITH THE DRINKER

[75] Inventors: Lavone L. Miller, New Paris; Timothy William Momont, Wolcottville; Roger Steven Kiphart, Warsaw, all of Ind.

[73] Assignee: CTB, Inc., Milford, Ind.

[21] Appl. No.: 08/886,171

[22] Filed: Jun. 30, 1997

[51] Int. Cl.[6] ........................... A01K 39/04; A01K 39/02
[52] U.S. Cl. ......................................... 119/51.5; 119/72.5
[58] Field of Search ................................. 119/51.5, 72.5

[56] References Cited

U.S. PATENT DOCUMENTS

| | | | |
|---|---|---|---|
| 1,843,138 | 2/1932 | Markey | 119/51.5 X |
| 2,527,324 | 10/1950 | Muehlfeld | 119/51.5 |
| 2,678,630 | 5/1954 | Frederiksen | 119/75 |
| 2,726,636 | 12/1955 | Frederiksen | 119/72.5 |
| 3,529,575 | 9/1970 | Schalk | 119/72.5 |
| 3,741,162 | 6/1973 | Lopez | 119/51.13 |
| 4,196,699 | 4/1980 | Leeming | 119/81 |
| 4,402,343 | 9/1983 | Thompson et al. | 137/614.2 |
| 4,416,221 | 11/1983 | Novey | 119/72.5 |
| 4,770,126 | 9/1988 | Hostetler | 119/81 |
| 4,793,291 | 12/1988 | Hostetler | 119/81 |
| 4,825,811 | 5/1989 | O'Kelley | 119/51.5 |
| 4,896,629 | 1/1990 | Johnson | 119/72.5 |
| 5,022,421 | 6/1991 | Johnson | 137/15 |
| 5,070,817 | 12/1991 | Momont | 119/75 |
| 5,154,138 | 10/1992 | Siddiqui et al. | 119/72.5 |
| 5,456,210 | 10/1995 | Miller | 119/75 |
| 5,816,194 | 10/1998 | Huff | 119/72.5 |

*Primary Examiner*—Robert P. Swiatek
*Attorney, Agent, or Firm*—Trexler, Bushnell, Giangiorgi & Blackstone, Ltd.

[57] ABSTRACT

A drinker, which is connected to a supply pipe, includes a novel attachment member that forces a bird's beak open during activation to deliver water directly into the bird's open beak so that the amount of water the bird receives is maximized. A pin is provided as a valve which selectively blocks or allows flow from the supply pipe to the attachment member. When a bird contacts the attachment member, the bird's beak is forced open and the attachment member substantially prevents contact of the beak with the water flowing through the attachment member, such that the water flows from the supply pipe, past the pin, through the attachment member, out an outlet on the attachment member and into the bird's open beak. A first embodiment of the attachment member includes a double-walled body member having inner and outer walls such that the water flows between the inner and outer walls. A second embodiment of the attachment member includes a single-walled body member. The pin has a flattened end attached thereto that is seated in the body member passageway. The water flows through the attachment member between the flattened pin end and the interior of the attachment member passageway. The advantages provided by the drinker allow it to be combined with a feeder. The feed collects in a feed pan suspended below the drinkers. A novel drip pan or troughs may be provided between the feed pan and the drinkers to collect any excess water.

16 Claims, 6 Drawing Sheets

ATTACHMENT MEMBER FOR A POULTRY DRINKER AND POULTRY FEEDER FOR USE WITH THE DRINKER

BACKGROUND OF THE INVENTION

This invention is generally directed to a novel poultry drinker that forces a bird's beak open during activation, thereby increasing water consumption by the bird by causing water to flow directly into the bird's open beak. The present invention is also directed to a novel combination of a poultry drinker and a poultry feeder.

There have been numerous designs for drinkers for supplying water to poultry. One such design provides drinkers having a straight solid pin which is connected to a valve system in the drinker. The drinker is attached to a supply pipe. When a bird contacts the solid pin, the pin is moved upwardly and the valve system is opened. This allows water to flow from the supply pipe, through the valve system and along the exterior surfaces of the solid pin. It has been found that poultry, and especially turkeys, more commonly bite at the pin to activate the drinker rather than activating the drinker by pecking or otherwise pushing up on the pin. While the solid pin design can provide sufficient water flow, because the bird bites at the pin, the beak closes around the pin and intersects the water stream. This often causes the water to run down the pin, down the outside of the beak and onto the exterior of the bird's beak, instead of into the bird's mouth. This wastes water and creates wetness in the poultry house requiring the house to be cleaned frequently and otherwise results in unsanitary and unsuitable conditions. Bacterial growth and infection within the house can devastate commercial productivity.

Another disadvantage of prior art drinkers that cause excessive amounts of dispensed water not to be consumed by the poultry and spill or leak away from the drinkers is that the drinkers are required to be maintained in a separate position in the poultry house, away from any feeders located therein. Therefore, because of the distances between the drinkers and feeders, the poultry tend to wander around the poultry house, thereby not maximizing the time spent drinking or feeding.

The present invention is intended to provide a novel drinker that substantially eliminates these problems and presents several advantages over the prior art which will become apparent upon a reading of the specification when examined in combination with a study of the drawings.

OBJECTS AND SUMMARY OF THE INVENTION

A general object of the present invention is to provide a novel poultry drinker that forces a bird's beak open during activation and delivers the water directly into the bird's open beak.

Another general object of the present invention is to provide a novel drinker that is combined with a feeder.

Briefly, and in accordance with the foregoing, the present invention discloses a novel poultry drinker that increases water consumption by the poultry by delivering water directly into the bird's open beak which is forced open by the drinker during activation of the drinker. The advantages provided allow the novel drinker of the present invention to be combined with a feeder that supplies feed to the poultry to maximize feeding and drinking by the poultry.

The poultry drinker includes a cap and insert seated therein, a valve which is formed of a pin, and a novel attachment member that is fixedly attached to the pin. The cap is attached to a water supply source, such as a pipe which is suitably supplied with water, which supplies water to the drinker. The pin can be moved to block the flow of water from the supply pipe to the attachment member and can be moved to allow water to pass from the supply pipe to the attachment member.

The attachment member includes a body member that has a passageway, which is preferably provided through the body member, for allowing the water to pass from the supply pipe to an outlet on the body member. When a bird bites on the body member, the body member and the pin are moved relative to the cap and insert to unseat the pin from engagement with the cap and insert so as to allow water to flow from the supply pipe, into the body member passageway, out the body member outlet and into the bird's opened beak.

A first embodiment of the attachment member is formed of a funnel which includes a body member having an outer wall and an inner wall spaced from the outer wall, and wherein the water flows through the body member between the inner and outer walls. The body member includes a plurality of spaced apart ribs between the inner and outer walls for supporting the inner wall within the outer wall. The inner wall is further provided with a passageway therethrough. A plurality of spaced apart slots and a plurality of tangs are provided on the inner wall, with at least one tang being provided along the interior of the inner wall between adjacent slots. When the pin is inserted into the inner wall passageway, the inner wall flexes to allow the pin to be press fit therein and the tangs grip the pin.

A second embodiment of the attachment member is formed from a cone and includes a single-walled body member. In this second embodiment, the pin of the drinker has a flattened end which is seated in a passageway in the body member. The water flows through the body member between the flattened pin end and the interior of the body member passageway.

The attachment member may be mounted over a drip pan or troughs which catch any excess water dispensed from the attachment member. Alternatively, the drip pan or troughs can be eliminated.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS

Figure 1:
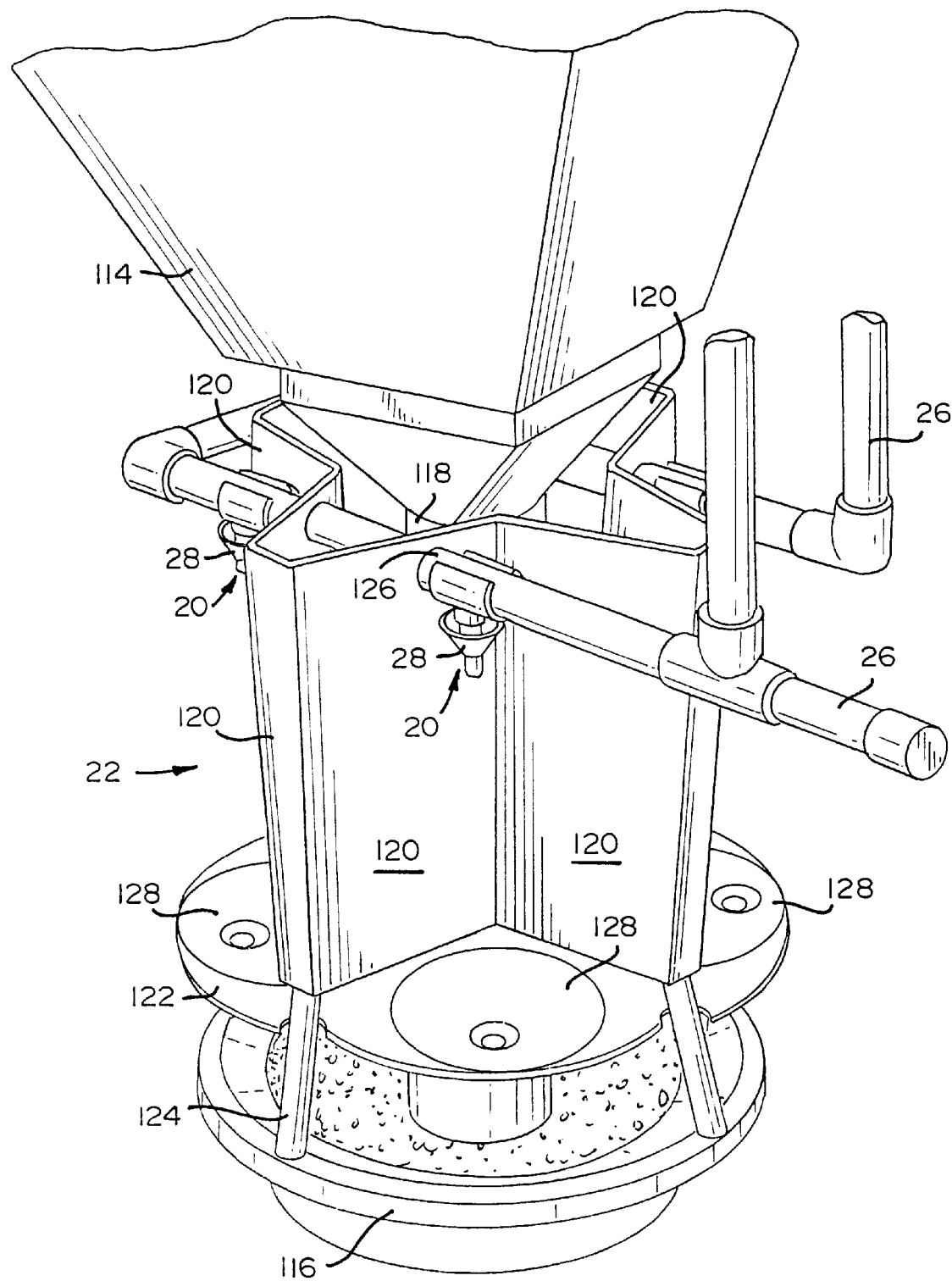
FIG. 1 is a perspective view of a novel drinker and feeder combination for supplying water and feed to poultry, especially turkeys, which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 8:
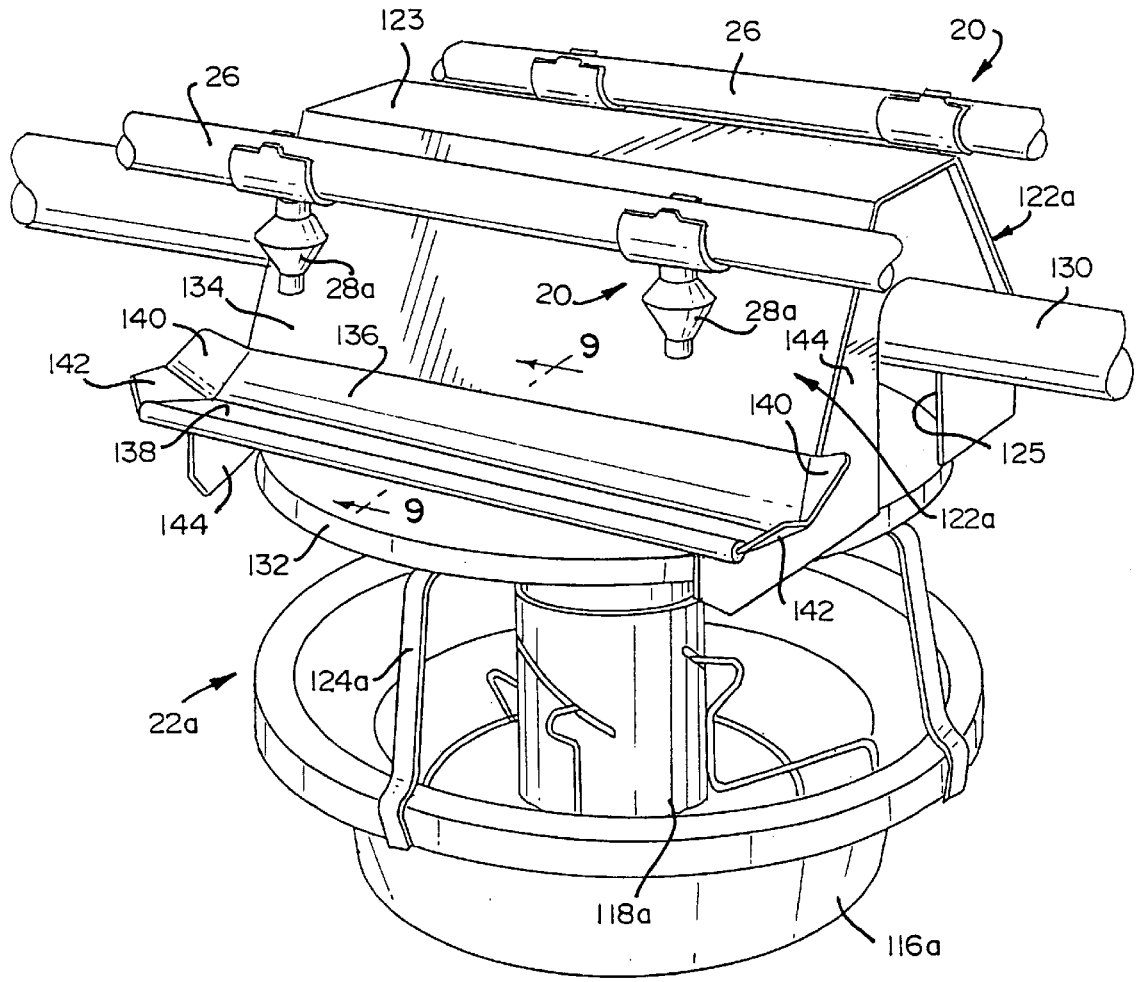
FIG. 8 is a perspective view of an alternative combination of the novel drinker and feeder for supplying water and feed to poultry, especially turkeys, which incorporates the features of the invention.
Figure 10:
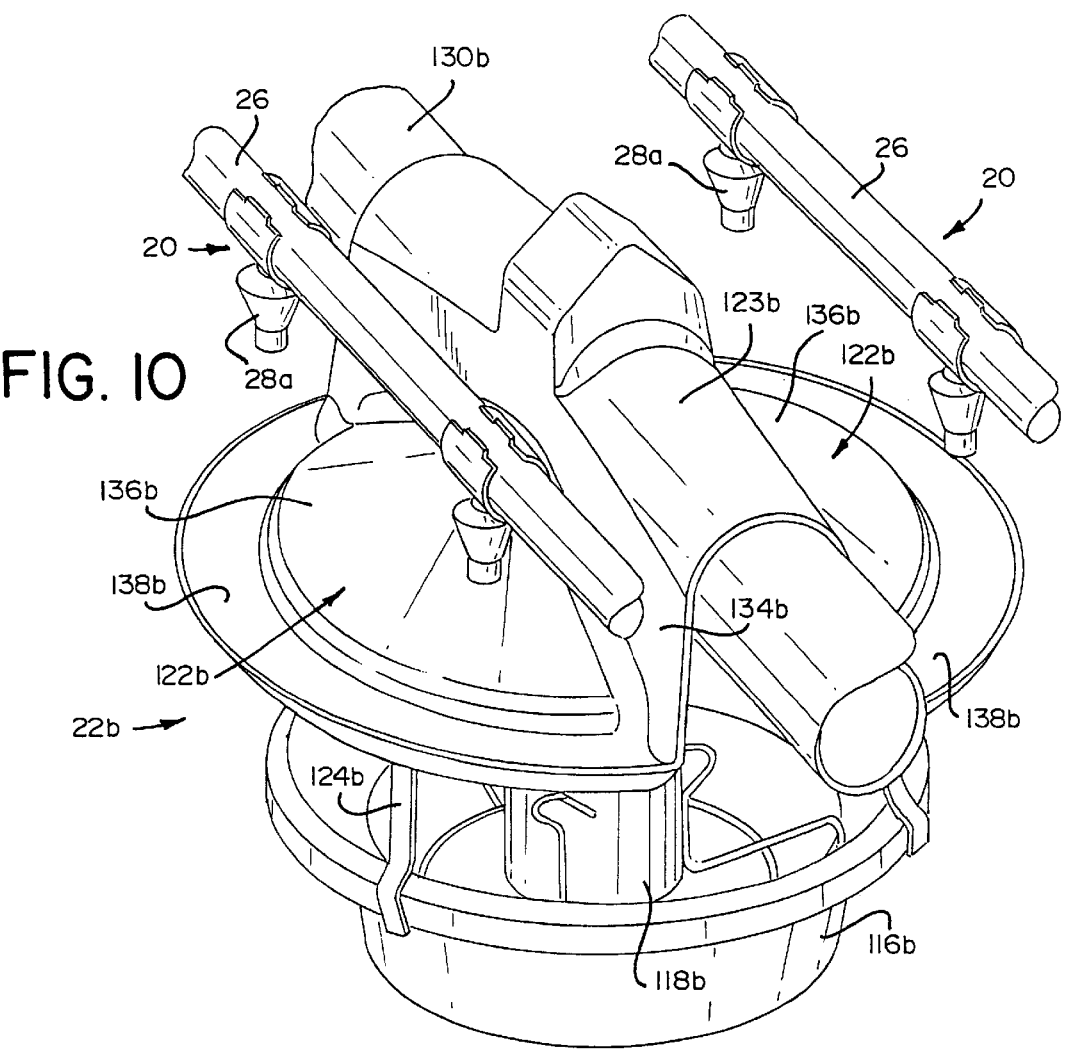
FIG. 10 is a perspective view of yet another alternative combination of the novel drinker and feeder for supplying water and feed to poultry, especially turkeys, which incorporates the features of the invention.

As shown in FIG. 1, a plurality of drinkers 20 which supply water for poultry and the like have been combined with a feeder 22 which supplies feed for poultry and the like. An alternate embodiment of the feeder 22a, 22b is shown in FIGS. 8 and 10, respectively. The drinkers 20 and the feeder 22, 22a, 22b are primarily envisioned for use with turkeys 24, but it is to be understood that the drinkers and feeder 20 and 22, 22a, 22b may be provided for use in supplying water and feed to other types of birds, such as chickens. By keeping the feeder 22, 22a, 22b close to the water supply provided by the drinkers 20, a better feeder results.

Each drinker 20 is connected to a water supply source, such as a pipe 26 which is suitably supplied with water, which supplies water at a low pressure to the drinkers 20. Each drinker 20 is provided with a novel attachment member 28, 28a which incorporate the features of the invention and is described in detail herein. A first embodiment of the novel attachment member 28 is shown in FIGS. 2–5 and is generally in the shape of a funnel. A second embodiment of the novel attachment member 28a is shown in FIGS. 6 and 7 and is generally in the shape of a cone. Water flows to each attachment member 28, 28a connected to the supply pipe 26 and is controlled by a valve system 30 in the drinker 20. The novel design of the attachment member 28, 28a forces a bird's beak 32 open when a bird 24 bites at the attachment member 28, 28a to activate the drinker 20, thereby increasing water consumption by the bird 24 by causing water to flow directly into the bird's open beak 32 and thereby causing a minimal amount of water to flow out of the bird's beak 32.

The valve system 30 used in each drinker 20 includes a plastic cap 34 which has an upper end that is fixedly joined with an outlet on the supply pipe 26 by suitable means. The cap 34 has an upper cylindrical wall portion 36 joined to a lower cylindrical wall portion 38 by a tapered wall portion 40. The upper cylindrical wall portion 36 is fixedly joined with the pipe 26. A passageway 42 is provided through the cap 34 from the pipe outlet to the lower end of the cap 34. A stainless steel insert 44 is provided in the lower portion of the cap 34 and has an upper tapered portion 46 which corresponds in shape to the tapered wall portion 40 and a lower cylindrical portion 48 which corresponds in shape to the lower cylindrical wall portion 38 such that the insert 44 sits snugly against the wall portions 38, 40. A passageway 50 is provided through the center of the insert 44 and corresponds in shape to the portions 46, 48. The interior of the tapered portion 46 provides a seat 49 for reasons described herein. A stainless steel pin 51, 51a, which is described with respect to each embodiment herein, forms part of the valve system 30 and is provided for connecting the attachment member 28, 28a, respectively, to the insert 44 and cap 34.

Attention is now directed to FIGS. 2–5 which show the first embodiment of the novel attachment member 28. The attachment member 28 is preferably formed from plastic and is formed from a funnel-shaped, double-walled body member 52 that includes an outer wall 54 and an inner wall 56 seated within the outer wall 54.

The outer wall 54 has an upper truncated cone section 58 having an upper, larger radiused end and a lower, smaller radiused end, and a lower cylindrical section 60 having an open end that is joined to the smaller radiused end of the truncated cone section 58. A passageway 62 is provided through the upper and lower sections 58, 60 of the outer wall 54 such that section 58 provides an upper inlet and section 60 provides a lower outlet.

The inner wall 56 is generally tubular having a passageway therethrough, and open upper and lower ends. The inner wall 56 is joined to the lower cylindrical section 60 of the outer wall 54 by a plurality of spaced apart ribs 64 such that a passageway 66 is provided between the inner and outer walls of the attachment member 28. The lower end of the inner wall 56 and the lower end of the outer wall 54 are flush with each other. The upper end of the inner wall 56 extends into the passageway 62 provided by the upper section 58 of the outer wall 54.

Figure 4:
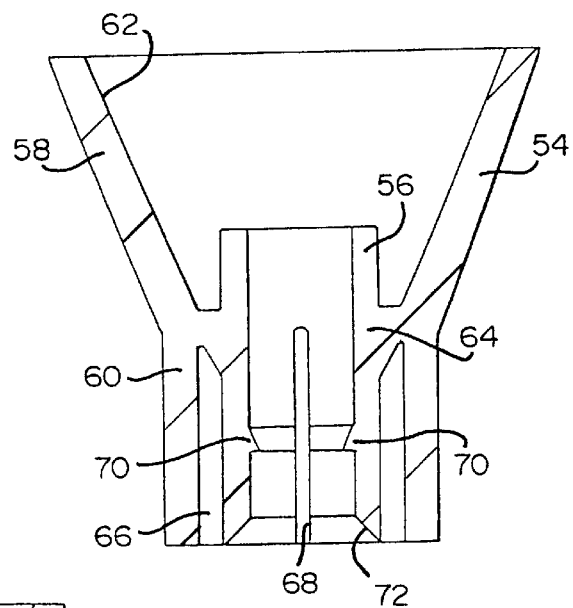
FIG. 4 is a cross-sectional view of the attachment member along line 4—4 in FIG. 3.
Figure 5:
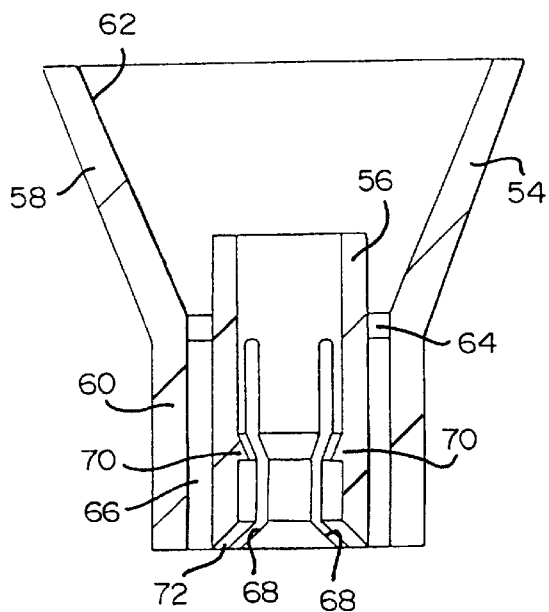
FIG. 5 is a cross-sectional view of the attachment member along line 5—5 in FIG. 3.
Figure 6:
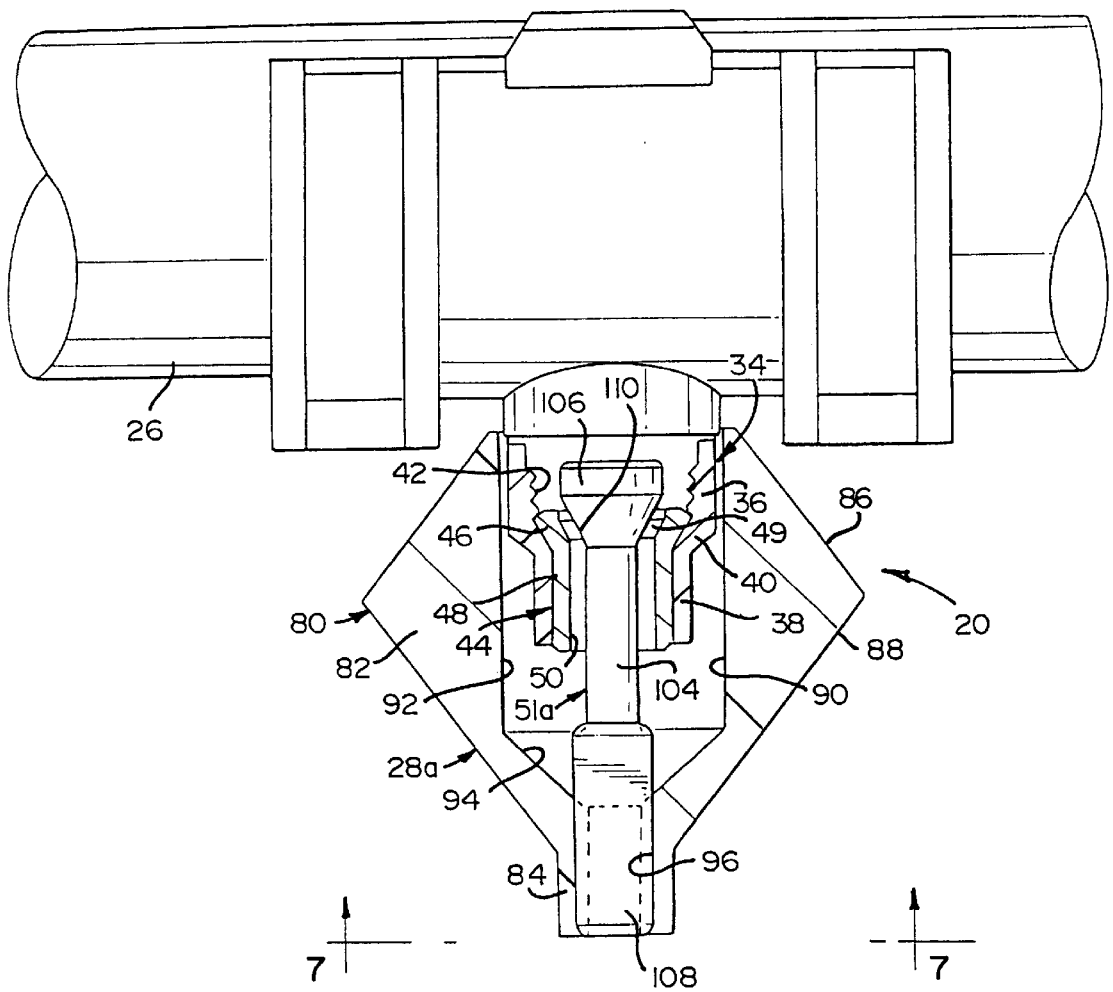
FIG. 6 is a drinker which is shown partially in cross-section and partly in elevation and which is provided with a second embodiment of a novel attachment member which incorporates the features of the invention.
Figure 7:
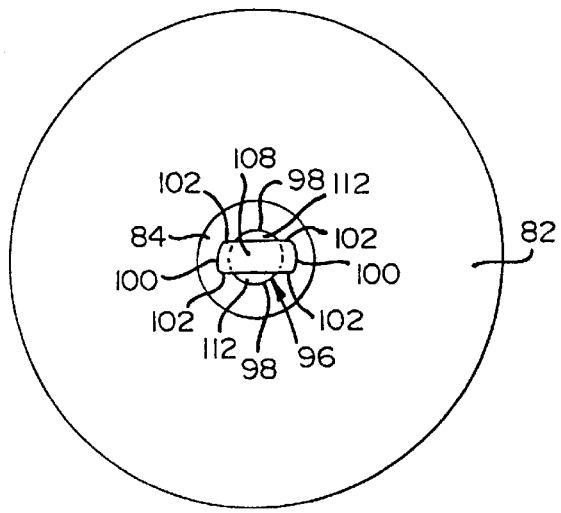
FIG. 7 is a partial, bottom plan view of the drinker shown along line 7—7 of FIG. 6.

As best illustrated in FIGS. 4–6, the inner wall 56 is provided with a plurality of spaced apart slots 68 which extend from the bottom end of the inner wall 56 upwardly along the length of the inner wall 56 a predetermined distance, but not along the entire distance of the wall 56, to divide the lower portion of the inner wall 56 into sections between the slots 68. Each section between the slots 68, along the inner surface thereof, has at least one inwardly directed tang 70 provided thereon for reasons described herein. As shown in the drawings, four slots 68 and four tangs 70 are provided, however, it is envisioned that as few as two can be provided and more than four can be provided. In addition, at the lower end of the inner wall 56, an inward bevel 72 is provided for reasons described herein.

Figure 2:
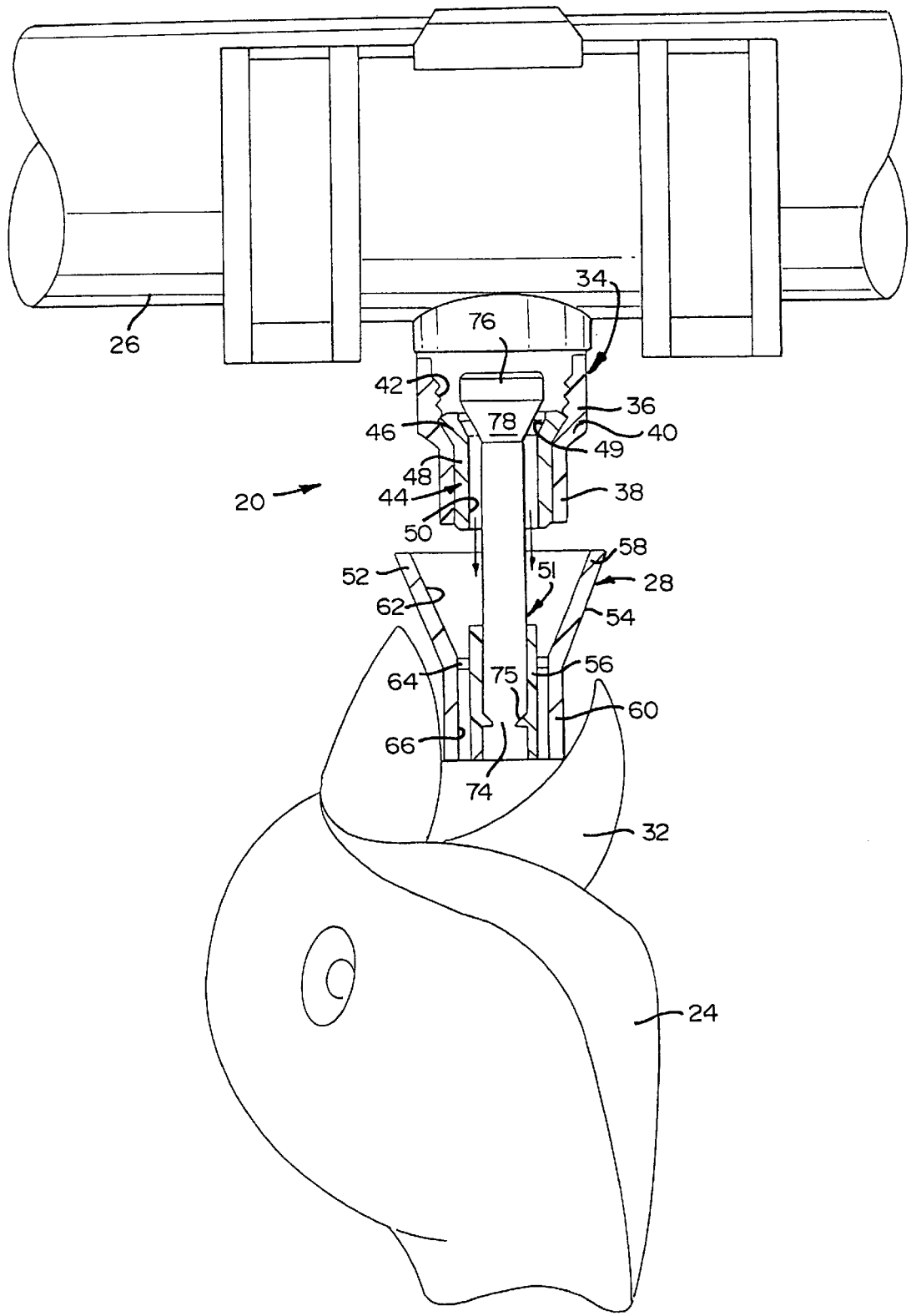
FIG. 2 is a side elevational view of a head of a turkey and a drinker which is shown partially in cross-section and partly in elevation and which is provided with a first embodiment of a novel attachment member which incorporates the features of the invention.
Figure 3:
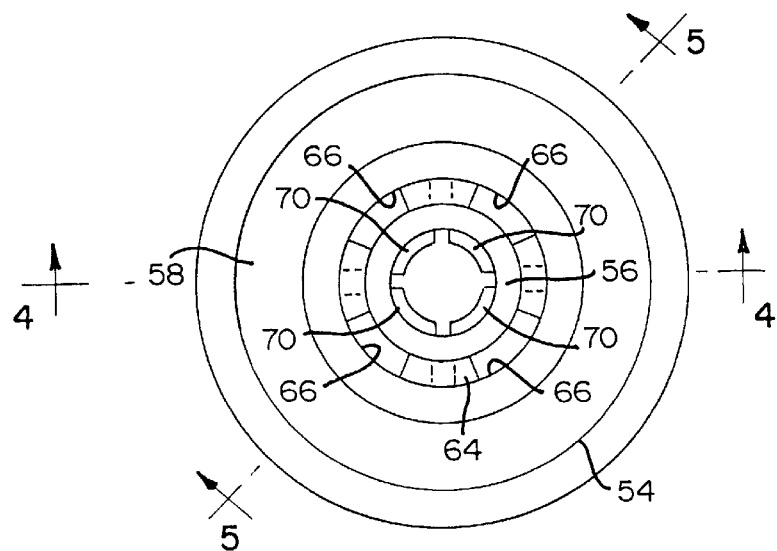
FIG. 3 is a top plan view of the attachment member used in the drinker shown in FIG. 2.

The pin 51 used with the first embodiment of the attachment member 28 for connecting the attachment member 28 to the insert 44 and cap 34 is shown in FIG. 2. The pin 51 includes an elongated, cylindrical stem 74 and a head 76. The stem 74 has a diameter that is less than the diameter of the passageway 50 through the insert 44 and includes a notch 75 therearound proximate to the end of the stem 74 opposite to that of the head 76. The head 76 includes a tapered outer surface portion 78 proximate to the stem 74 which is disposed at the same angle as the tapered wall section 46 of the insert 44.

To connect the attachment member 28, pin 51, cap 34 and insert 44 together, the stem 74 of the pin 51 is inserted through the larger radiused end of the cap 34 and through the passageways 42, 50 provided by the cap 34 and the insert 44 until the tapered outer surface portion 78 of the pin head 76 seats against the seat 49 provided by the tapered portion 46 of the insert 44. Thereafter, the stem 74 of the pin 51 is inserted through the attachment member 28, first, by inserting the stem 74 through the larger radiused end of the truncated cone section 58 of the outer wall 54, and second, by inserting the stem 74 into the passageway provided through the inner wall 56 of the attachment member 28. The diameter of the cylindrical stem 74 is the same as the internal diameter of the passageway through the inner wall 56 and slightly greater than the internal diameter of the passageway between the tangs 70. When the stem 74 contacts the tangs 70, the inner wall 56 flexes outwardly to allow the stem 74 to be press fit therein. The stem 74 is pushed through the passageway provided by the inner wall 56 until the end of the stem 74 is flush with the bottom of the body member 52. The tangs 70 move into the notch 75 provided on the stem 74 such that the inner wall 56 flexes inwardly and sits against the stem 74. The inner wall 56 fixedly grips the stem 74 because of the engagement of the tangs 70 with the notch 75 provided on the stem 74. The length of the stem 74 is such that the upper end of the attachment member 28 is spaced from the lower end of the cap 34 and insert 44. Thereafter, the cap 34 with the pin 51 and attachment member 28 attached thereto are suitably secured to the supply pipe 26.

When a bird 24 is not biting the attachment member 28 so as to release water, the tapered surface portion 78 of the pin head 76 seats against the seat 49 provided by the tapered portion 46 of the insert 44. Because the pin head 76 blocks the passageway 50 through the insert 44, water cannot flow from the pipe 26 to the attachment member 28.

When a bird 24 bites the attachment member 28, the attachment member 28 and pin 51, which is affixed thereto, are moved upwardly relative to the cap 34 and the insert 44 to the position shown in FIG. 2, such that the tapered surface portion 78 of the pin head 76 is lifted away from the seat 49. This provides a clear passageway for water to flow from the pipe 28, around the head 76 of the unseated pin 51, along the sides of the pin stem 74 and into the truncated cone section 58 of the attachment member 28. The water then flows through the passageway 66 provided between the outer and inner walls 54, 56 of the attachment member 28 to the bottom outlet of the attachment member 28 and directly into the bird's open beak 32.

Because the water flow is provided through the attachment member 28 such that the bird's beak 32 does not contact or intersect the water stream, instead of along the sides of a solid pin as occurs in the prior art where the water stream is intersected by the bird's beak, the water does not generally flow along the sides of the beak 32. The bird 24 is forced to open its beak 32 around the lower cylindrical section 60 of the outer wall 54 when it bites at the attachment member 28. It has been found that poultry bite at the attachment member 28, rather than activating the drinker 20 by pecking or otherwise pushing up on the bottom of the attachment member 28 to dispense the water from the drinker 20. This forces the bird's beak 32 open around the lower cylindrical section 60 of the attachment member 28 such that substantially all of the water flows into the bird's mouth. This maximizes the flow of water directly into the bird's mouth as the bird's beak 32 is forced to open around the bottom the attachment member 28 and does not contact the water stream. As the attachment member 28 is wide at the bottom thereof, which results from the provision of the outer and inner walls 54, 56, the passageway 66 between the walls 54, 56 and the passageway in the inner wall 56, the bird is forced to open its mouth wider to enclose the end of the attachment member 28.

Once the bird 24 stops biting the attachment member 28, the attachment member 28 and pin 51 attached thereto will move downwardly relative to the cap 34 and insert 44 as a result of gravity. The attachment member 28 and pin 51 will move downwardly relative to the cap 34 and insert 44 until the tapered portion 78 of the pin head 76 once again seats against the seat 49.

The inward bevel 72 at the bottom end of the inner wall 56 allows a tool with an outward bevel to be forced upward between the pin stem 74 and the inner wall 56 thereby moving the sections between the slots 68 of the inner wall 56 away from the pin 51. Once the sections between the slots 68 have been moved far enough away from the pin 51 such that the tangs 70 do not engage within the notch 75 on the stem 74, the attachment member 28 can be slid off of the stem 74 for cleaning or replacement. It is envisioned that the slots 68, tangs 70 and notch 75 can be eliminated and instead, the stem can be fixed to the interior of the inner wall 56 by other suitable means which would release the attachment member 28 from the pin 51, or by means which would not release the attachment member 28 from the pin 51 such as adhesive.

Attention is now directed to FIGS. 6 and 7 which show the second embodiment of the novel attachment member 28a. With this embodiment, the risk that any dust or other environmental debris will enter the interior of the attachment member 28a is minimized. The attachment member 28a is made of plastic and includes a cone-shaped, single-walled body member 80. The body member 80 includes an upper wall portion 82 and a lower wall portion 84 which are integrally formed with each other.

The upper wall portion 82 has an upper, outwardly tapering surface 86 and a lower, inwardly tapering surface 88. A cavity 90 is formed in the upper wall portion 82 and is formed from an upper generally cylindrical section 92 and a lower truncated conical section 94, the base of which joins with the upper section 92. An inlet opening is provided at the top of the upper section 92 and an outlet opening is provided at the truncation of the lower section 94. Because of the outwardly and inwardly tapering surfaces 86, 88, the wall of the body member 80 is relatively thick proximate to the cavity 90.

The lower wall portion 84 of the attachment member 28a is formed from a generally cylindrical wall having a passageway 96 therethrough. As shown in FIG. 7, the passageway 96 has an opposed pair of surfaces 98, each having a smaller radius, and an opposed pair of surfaces 100, each having a larger radius than that of the smaller radiused sections 98. The smaller radiused surfaces 98 are joined to the larger radiused surfaces 100 by flat surfaces 102.

A stainless steel pin 5a is provided for connecting the attachment member 28a to the cap 34 and insert 44. The pin 51a includes an elongated, cylindrical stem 104 having an elongated flat end portion 108 at one end thereof. A head 106 is provided at the other end of the stem 104. The stem 104 has a diameter which is less than the diameter of the passageway 50 through the insert 44. The flat end portion 108 of the pin 51a corresponds in shape to the shape between the pair of larger radiused surfaces 100 and the flat surfaces 102 in the passageway 96 as shown in FIG. 7. The head 106 includes a tapered outer surface portion 110 proximate to the stem 104 which is disposed at the same angle as the tapered wall section 46 of the insert 44.

To connect the attachment member 28a to the cap 34 and insert 44, the stem 104 of the pin 51a is inserted through the inlet end of the cap 34 and through the passageways 42, 50 provided by the cap 34 and insert 44 until the tapered surface portion 110 of the pin head 106 seats against the seat 49 provided by the tapered portion 40 of the insert 44. Thereafter, the elongated flat end portion 108 of the pin stem 106 is inserted through the upper section 94 of the cavity 90 and then into the lower section 96 of the cavity 90 until the end of the flat end portion 108 is flush with the lower end of the lower wall portion 84. Because the elongated flat end portion 108 of the pin 51a has a shape that corresponds to the area between the opposed larger radiused surfaces 100 and the flat surfaces 102, the end edges of the flat end portion 108 sit against the larger radiused surfaces 100 and part of the side edges sit against the flat surfaces 102 of the passageway 96. A passageway 112 is provided between each of the opposite sides of the pin flat end portion 108 and the smaller radiused surfaces 98. The end portion 108 of the pin 51a is affixed to the interior of the passageway 96 by suitable means, such as adhesive. Because of the flat end portion 108, the attachment member 28a does not spin on the pin 51a. Thereafter, the cap 34 with the pin 51a and attachment member 28a attached thereto are suitably secured to the pipe 26.

As shown in the FIG. 6, the upper end of the upper wall portion 82 of the body member 80 is generally proximate to the upper end of the cap 34 such that the cap 34 and insert 44 are substantially enclosed within the body member 80 when the pin head 106 is disengaged from its seat 49 as described herein. It is to be understood that the upper end of the upper wall portion 82 is generally proximate to the cap upper end even when the pin head 106 is seated against the seat 49 such that the cap 34 and insert 44 are substantially enclosed within the body member 80.

When a bird 24 is not biting the attachment member 28a so as to release water from the drinker 20, the tapered surface portion 110 of the pin head 106 seats against the seat 49 provided by the tapered section 46 of the insert 44. Because the pin head 106 blocks the passageway 50 through the insert 44, water cannot flow from the pipe 26 to the attachment member 28a.

When a bird 24 bites the attachment member 28a, the attachment member 28a and pin 51a, which is affixed thereto, are moved upwardly relative to the cap 34 and insert 44 to the position shown in FIG. 6, such that the tapered surface portion 110 of the pin head 106 is lifted away from the seat 49. This provides a clear passageway for water to flow from the pipe 26, around the head 106 of the unseated pin 51a, through the passageway 50 in the insert 44 and into the attachment member cavity 90. The water then flows through the passageways 112, which are provided between the flat sides of the pin 51a and the smaller radiused surfaces 98, to the bottom outlet of the attachment member 28a and into the bird's opened beak 32.

Because the water flow is provided through the attachment member 28a such that the bird's beak does not contact or intersect the water stream, water does not generally flow along the sides of the bird's beak. The bird 24 is forced to open its beak 32 around the lower wall portion 84 of the body member 80 when it bites at the attachment member 28a. This forces the bird's beak 32 open around the bottom of the attachment member 28a such that substantially all of the water flows into the bird's mouth. This maximizes the flow of water directly into the bird's mouth as the bird's beak 32 is forced to open around the bottom the attachment member 28a and does not contact the water stream.

Once the bird stops biting the attachment member 28a, the attachment member 28a and pin 51a will move downwardly relative to the cap 34 and insert 44 as a result of gravity. The attachment member 28a and pin 51a will move downwardly until the tapered surface portion 110 of the pin head 106 once again seats against the seat 49 provided by the insert 44, thus stopping the flow of water through the insert passageway 50 to the attachment member 28a. Water is not held in the attachment member 28a except to a minor degree at the very bottom of the attachment member 28a by cohesive forces. This excess water is normally absorbed by debris.

It is envisioned that the flat end portion 108 of the pin 51a can be held in the body member 80 by other suitable means, such as tangs, slots and a notch provided on the flat end portion 108 as described with respect to the first embodiment of the attachment member 28. It is also envisioned that the lower wall portion 84 of the body member 80 can be provided with an inward bevel, as described with respect to the first embodiment of the attachment member 28, so that the attachment member 28a can be released from the pin 51a with a suitable tool as described herein.

It is also envisioned in either embodiment of the novel drinker 20 that the passageways 66, 112 in the attachment member 28, 28a do not need to be completely surrounded by an outer wall. Instead, the passageways could be provided substantially along the outer wall of the attachment member 28, 28a so long as the bird's beak 32 cannot directly contact the water stream such that the water could be directed over bird's beak 32 as occurs in the prior art.

As shown in FIG. 1, the drinker 20 which includes the novel attachment member 28 of the present invention can be combined with the feeder 22. Of course, the embodiment of the attachment member 28a shown in FIGS. 6 and 7 can be provided with this feeder 22. The feeder 22 includes a hopper 114 which supplies feed to a feed container or pan 116 by a feed tube 118. The hopper 114 and the feed pan 116 which is connected thereto by the feed tube 118, are suspended above the floor level. The release of feed into the feed pan 116 is controlled by suitable, known means.

A plurality of wall members 120 extend from the hopper 114 downwardly to a drip pan 122 and divide the drip pan 122 into a plurality of stations (as shown— four stations). The wall members 120 substantially surround the feed tube 118 so as to prevent the poultry 24 from pecking at the feed tube 118. Sufficient wall members 120 may be provided to divide the drip pan 122 into fewer or more stations as desired. The wall members 120 are connected to the feed pan 116 by struts 124 and each may be provided with an aperture 126 for allowing the pipe 26 to pass therethrough so that one pipe 26 can supply water flow to more than one station. As shown, an attachment member 28 is provided at each station above the drip pan 122. The drip pan 122 is suspended above the feed pan 116 such that the poultry 24 can peck at the feed held in the feed pan 116 between the drip pan 122 and the feed pan 116. In the embodiment shown in FIG. 1, because the feeder 22 has been divided up into four stations, the drip pan 122 has four sloped surfaces 128 thereon so that any excess water that is not immediately consumed by the poultry 24 is held on top of the drip pan 122.

As shown in FIG. 8, the drinker 20 which includes the novel attachment member 28a of the present invention can be combined with the feeder 22a. Of course, the embodiment of the attachment member 28 shown in FIGS. 2–5 can be provided with this feeder 22a. Like elements are denoted and illustrated by like reference numerals with the embodiment of the feeder 22a being denoted by the suffix "a" after the reference numerals.

The feeder 22a includes a conventional automated auger feed system which is formed from a supply tube 130, that has an auger therein, which connects with the feed container or pan 116a by a feed tube 118a. A hood 132 extends outwardly from the feed tube 118a and is spaced a predetermined distance from the supply tube 130. Like that shown in FIG. 1, the supply tube 130, the feed pan 116a and the feed tube 118a are suspended above the floor level.

In this embodiment, the wall members 120 used with the feeder 22 have been eliminated. Instead, a trough 122a extends downwardly from each side of the supply tube 130, thereby forming the drip pan, and the drinkers 20 and the pipes 26 are suspended thereabove. Each trough 122a is connected at their uppermost ends by a wall 123 and each trough 122a rests on top of the hood 132 and is connected thereto. The hood 132 is connected to the feed pan 116a by struts 124a. Each trough 122a is suspended above the feed pan 116a such that the poultry 24 can peck at the feed held in the feed pan 116a between the troughs 122a and the feed pan 116a.

Figure 9:
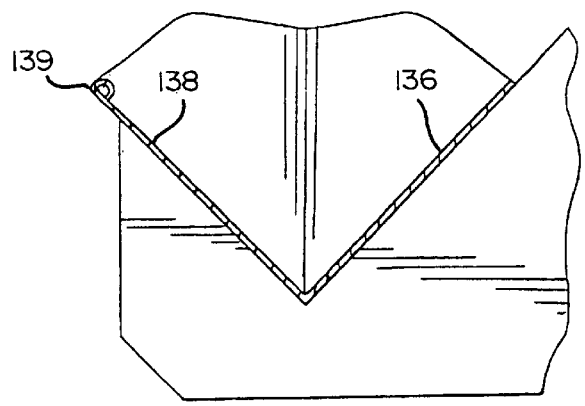
FIG. 9 is a cross-sectional view of a trough provided in the feeder along line 9—9 of FIG. 8.

Each trough 122a has a first wall 134 which extends downwardly from the wall 123 and is angled relative thereto, a second wall 136 which connects with the lowermost end of the first wall 134 and is angled relative thereto, and a third wall 138 which is connected to the lowermost end of the second wall 136 and is angled relative thereto. The second and third walls 136, 138 generally form a "V" as shown in FIG. 9. A bead 139 can be provided on the upper end of the third wall 138 so as to prevent injury to the bird's neck when it is rubbed on the wall 138. Each trough 122a has end walls 140, 142 that are respectively angled upwardly relative to the second and third walls 136, 138. Downwardly extending walls 144 are provided at each end of the troughs 122a and generally connect between the first, second and third walls 134, 136, 138 of each trough 122a, the wall 123 and the hood 132. A cutout 125 is provided in each wall 144 so as to allow the supply tube 130 to pass therethrough.

In each embodiment, the drip pan 122 or troughs 122a holds any excess water that is not immediately consumed by the poultry 24. This prevents any excess water discharged from the drinker 20 from falling onto the feed in the feed pan 116. It has been found that the poultry 24 eventually drink the water held on the drip pan 122 or troughs 122a.

Figure 11:
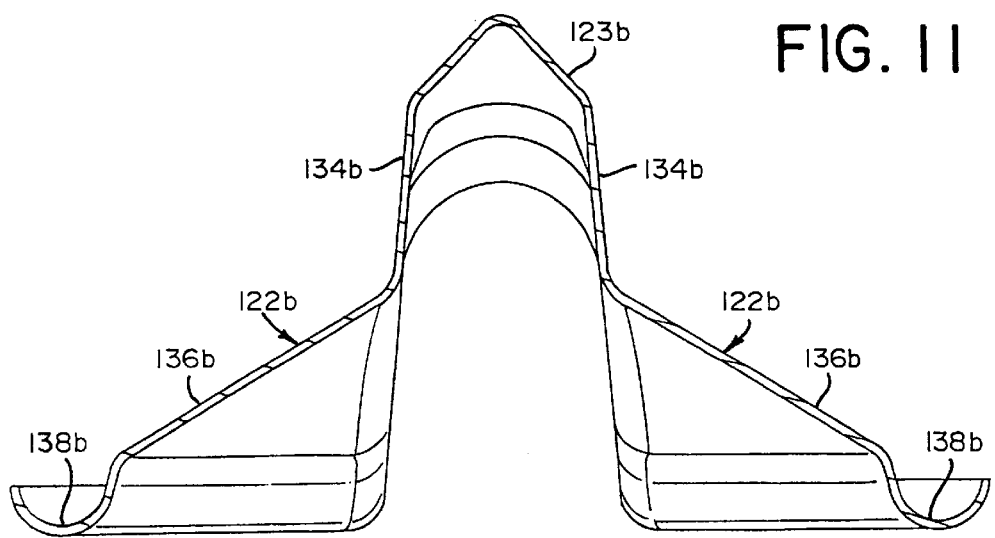
FIG. 11 is a cross-sectional view of troughs provided in the feeder of FIG. 10.

Attention is now directed to FIGS. 10 and 11.

This feeder 22b is identical in construction to that shown in FIGS. 8 and 9, except for the trough construction and that the hood 132 has been eliminated. Of course, with this embodiment, either attachment member 28, 28a can be used. Like elements are denoted by like reference numerals with the suffix "b" thereafter.

A trough 122b extends downwardly from each side of the supply tube 130, thereby forming the drip pan, and the drinkers 20 and the pipes 26 are suspended thereabove. Each trough 122b is connected at their uppermost ends by a top wall 123b and each trough 122b is connected to the struts 124b on the feed pan 116b. The top wall 123b is on top of the supply tube 130. The wall 123b is formed from a middle portion and two end portions. The middle portion extends upwardly from the end portions and the end portion taper downwardly from the middle portion until they rest on the supply tube 130. Each trough 122b is suspended above the feed pan 116b such that the poultry 24 can peck at the feed held in the feed pan 116b between the troughs 122b and the feed pan 116b.

Each trough 122b has first, second and thirds walls 134b, 136b, 138b, respectively. The first wall 134b extends downwardly from the side edges of the wall 123b and along the sides of the supply tube 130. The second wall 136b is joined with the lowermost end of the first wall 134b along the majority of the length thereof. The second wall 134b is generally formed from half of a cone. The third wall 138b is connected to the lowermost end of the second wall 136b and is formed from a concave surface relative to the second wall 136b. The third wall 136b extends along the entire length of the lowermost end of the second wall 134b such that it generally forms a half of a circle. A bead (not shown) can be provided on the outermost end of the third wall 138b so as to prevent injury to the bird's neck when it is rubbed on the wall 138b. The ends of the third wall 136b are closed by a portion of the first wall 132b which extends beyond the second wall 134b.

In this embodiment, like that of the other embodiments, the troughs 122b holds any excess water that is not immediately consumed by the poultry 24. This prevents any excess water discharged from the drinker 20 from falling onto the feed in the feed pan 116. In this embodiment, if excess water is discharged from the drinker 20, the water collects in the third wall 136b. If the water falls on the second wall 134b, the water will run down the second wall 134b and collect in the third wall 136b.

While the provision of a drip pan 122 or troughs 122a, 122b is the preferred embodiment, it is envisioned that with the novel attachment member 28, 28a of the present invention, there is not a need for the drip pan 122 or the troughs 122a, 122b. The amount of water that runs out of the bird's beak is minimal because the bird's mouth is forced to open around the attachment member 28, 28a. Therefore, very little water will run into the feed pan 116, 116a, 116b. Also, it has been found that some water in the feed enhances consumption by the birds. Therefore, in some instances the elimination of the drip pan 122 or trough 122a, 122b may be preferred.

While preferred embodiments of the present invention are shown and described, it is envisioned that those skilled in the art may devise various modifications of the present invention without departing from the spirit and scope of the appended claims.

The invention claimed is:

1. An attachment member for use with a poultry drinker, said poultry drinker including a water source for supplying water to said attachment member and valve means movably attached to the water source and capable of blocking the flow of water from the water source or capable allowing water to pass from the water source, said attachment member comprising: a body member being capable of being connected to the valve means, said body member including a passageway having an inlet port and an outlet port for allowing water to pass from the water source and through said body member, said outlet port having a predetermined diameter, said body member including a cylindrical end portion which defines an outlet surface that generally surrounds said outlet port, said outlet surface having a predetermined outer diameter which is substantially greater than the diameter of said outlet port, thereby forcing a bird's beak open when the bird contacts said cylindrical end portion and substantially preventing contact of the bird's beak with the water, such that when the bird contacts said cylindrical end portion, the valve means allows water to pass from the water source to the body member, into said body member passageway, out said outlet port and into the bird's open beak.

2. An attachment member as defined in claim 1, wherein said body member passageway is provided completely along an interior portion of said body member.

3. An attachment member as defined in claim 1, wherein said body member further includes means for gripping the valve means.

4. A attachment member as defined in claim 3, wherein said gripping means comprises a plurality of tangs along the body member and a plurality of slots in said body member, said slots being spaced apart from each other such that said body member can flex.

5. An attachment member for use with a poultry drinker, said poultry drinker including a water source for supplying water to said attachment member and valve means movably attached to the water source and capable of blocking the flow of water from the water source or capable allowing water to pass from the water source, said attachment member comprising: a body member being capable of being connected to the valve means, said body member including a passageway provided completely along an interior portion of said body member for allowing water to pass from the water source to an outlet on said body member, said body member including an outer wall and an inner wall spaced from said outer wall, and wherein the water flows through said body member between said inner and outer walls, said body member including a surface which forces a bird's beak open when the bird contacts the body member and which substantially prevents contact of the bird's beak with the water, such that when the bird contacts the body member, the valve means allows water to pass from the water source to the body member, into said body member passageway, out said body member outlet and into the bird's open beak.

6. An attachment member as defined in claim 5, wherein said body member further includes a plurality of ribs between said inner and outer walls for supporting said inner wall within said outer wall, said ribs being spaced apart from each other.

7. An attachment member as defined in claim 5, wherein said inner wall further includes a passageway therethrough in which the valve means is capable of being seated so as to prevent the flow of water through said passageway in said inner wall.

8. A drinker for providing water to poultry from a water source comprising: valve means attached to the water source capable of preventing the flow of water from the water source or allowing flow from the water source, said valve means comprising a pin, said pin having a stem and an end portion at one end of said stem, and an attachment member comprising a body member connected to the valve means, said body member including a passageway provided completely along an interior portion of said body member, said passageway having an inlet port and an outlet port for allowing water to pass from the water source and through said body member, said outlet port having a predetermined diameter, said end portion of said pin being seated within said passageway to block a portion of said outlet port and to leave a portion of said outlet port unobstructed so that water can pass through said body member, and further including an outlet surface generally surrounding said outlet port, said outlet surface having a predetermined outer diameter which is substantially greater than the diameter of said outlet port, thereby forcing a bird's beak open when the bird contacts the body member and substantially preventing contact of the bird's beak with the water, such that when the bird contacts the body member, said valve means allows water to flow from the water source, into said body member passageway, out of said outlet port and into the bird's open beak.

9. A drinker as defined in claim 8, wherein an end of said pin is flush with an end of said body member.

10. A drinker as defined in claim 8, wherein said end portion of said pin is flat.

11. A drinker for providing water to poultry from a water source comprising: valve means attached to the water source capable of preventing the flow of water from the water source or allowing flow from the water source, and an attachment member comprising a body member connected to the valve means, said body member including a passageway provided completely along an interior portion of said body member for allowing water to pass from the water source to an outlet on said body member, said body member including an outer wall and an inner wall spaced from said outer wall, and wherein the water flows through said body member between said inner wall and said outer wall, and said body member further including a surface which forces a bird's beak open when the bird contacts the body member and substantially prevents contact of the bird's beak with the water, such that when the bird contacts the body member, the valve means allows water to flow from the water source, into said body member passageway, out of said body member outlet and into the bird's open beak.

12. A drinker as defined in claim 11, wherein said inner wall further includes a passageway therethrough in which the valve means is fixedly seated so as to prevent the flow of water through said passageway in said inner wall.

13. A combination comprising: a feeder for supplying feed to the poultry, and a drinker for providing water to poultry from a water source, said drinker comprising valve means attached to the water source capable of preventing the flow of water from the water source or allowing flow from the water source, said valve means comprising a pins, said pin having a stem and an end portion at one end of said stem, and an attachment member comprising a body member connected to the valve means, said body member including a passageway provided completely along an interior portion of said body member, said passageway having an inlet port and an outlet port for allowing water to pass from the water source and through said body member, said outlet port having a predetermined diameter, said end portion of said pin being seated within said passageway to block a portion of said outlet port and to leave a portion of said outlet port unobstructed so that water can pass through said body member, and further including an outlet surface generally surrounding said outlet port, said outlet surface having a predetermined outer diameter which is substantially greater than the diameter of said outlet port, thereby forcing a bird's beak open when the bird contacts the body member and substantially preventing contact of the bird's beak with the water, such that when the bird contacts the body member, the valve means allows water to flow from the water source, into said body member passageway, out of said outlet port and into the bird's open beak.

14. The combination of claim 13, wherein said feeder includes a feed container for holding feed and means for retaining water suspended over said feed container, said drinker being suspended over said retaining means.

15. A combination comprising: a poultry drinker for supplying water to poultry and a poultry feeder for supplying feed to poultry, said feeder including a feed container for holding feed, said drinker being suspended over said feeder and having an outlet through which water flows facing said feeder, and means for retaining water after the water has been discharged from said drinker, said retaining means being suspended over said feed container and suspended under said drinker.

16. The combination of claim 15, wherein said drinker includes valve means attached to a water source and capable of selectively blocking flow from or allowing flow from the water source and an attachment member comprising a body member connected to said valve means, said body member including a passageway for allowing water to pass from the water source to an outlet on said body member and further including a surface which forces a bird's beak open when the bird contacts the body member and substantially prevents contact of the bird's beak with the water, such that when the bird contacts the body member, water flows through said valve means from the water source, into said body member passageway, out said body member outlet and into the bird's open beak.

* * * * *